Nov. 18, 1969  G. EGGSTEIN  3,478,519
MULTIPLE POWER BOOSTER ARRANGEMENT
Filed Jan. 30, 1967  5 Sheets-Sheet 1

INVENTOR
Giorgio Eggstein
BY
Michael S. Striker
ATTORNEY

Nov. 18, 1969  G. EGGSTEIN  3,478,519
MULTIPLE POWER BOOSTER ARRANGEMENT

Filed Jan. 30, 1967  5 Sheets-Sheet 5

INVENTOR
G. EGGSTEIN

BY  *Michael J. Striker*
ATTORNEY

United States Patent Office 3,478,519
Patented Nov. 18, 1969

3,478,519
MULTIPLE POWER BOOSTER ARRANGEMENT
Giorgio Eggstein, Turin, Italy, assignor to Ernst Heinkel, Aktiengesellschaft, Stuttgart-Zuffenhausen, Germany
Filed Jan. 30, 1967, Ser. No. 612,549
Claims priority, application Germany, Feb. 1, 1966, H 58,415
Int. Cl. F15b 13/10, 15/00, 7/08
U.S. Cl. 60—54.6                                        11 Claims

ABSTRACT OF THE DISCLOSURE

A force transmitting body is secured to the two power pistons of a power booster and operates the master piston of a hydraulic brake system. The force transmitting body contains all ducts required for the control of the power pistons by a membrane valve on one of the power pistons so that the master piston is first operated by the force of the operator, and then by the combined forces of both power pistons.

CROSS-REFERENCE TO A RELATED APPLICATION

My copending application Ser. No. 564,785, now Patent No. 3,387,455, entitled "Apparatus for Pressurizing Fluids" discloses a single piston power booster arrangement.

BACKGROUND OF THE INVENTION

The present invention relates to a power booster arrangement of the type in which an operating means, such as the master piston of a brake system, is first controlled by the operator whereupon a booster servomotor is actuated to apply a greater force which is particularly applied to the power brakes of a motor car.

Booster servomotors are known, which are operated by the negative pressure produced by the combustion engine of the car. It is also known to arrange several power pistons of the booster servomotor in a tandem arrangement, and to connect the chambers formed in the corresponding power cylinders by ducts so that the pneumatic pressures in the power cylinders act simultaneously on all power pistons whereby the produced booster force is the sum of the forces exerted by the several power pistons. Known power booster arrangements of this type require a duct system which is at least partly located outside of the power cylinders, which is due to the fact that the valve means by which the flow of pressure fluid between the chambers in the power cylinders is controlled, are not exclusively located in the axis of the pneumatic power pistons.

SUMMARY OF THE INVENTION

It is one object of the invention to provide a very compact power booster arrangement capable of providing a high booster force and suitable for use in a passenger car.

Another object of the invention is to provide a multiple power booster arrangement in which all necessary ducts are located within the power cylinders.

It is another object of the invention to provide a multiple power booster arrangement producing a high booster force as required for the operation of the master piston of a hydraulic brake system in a passenger car.

With these objects in view, one embodiment of the invention comprises first and second power piston means respectively movable in first and second power cylinder means and forming first and second low pressure chambers, and first and second variable pressure chambers in the power cylinder means; suction generating means, preferably constituted by the suction manifold of a combustion engine, and connected with at least one of the low pressure chambers; force transmitting means disposed in the power cylinder means and secured to the power piston means to connect the same for movement together, and being preferably a force transmitting body centrally located in the power cylinders and secured to both power pistons; valve means in duct means of the force transmitting means having a normal position connecting all pressure chambers through the duct means with each other, and an operative position connecting the variable pressure chambers with the atmosphere, and the low pressure chambers with each other; operating means, such as the master piston of a brake system, operatively connected with the force transmitting means; and operator controlled means operatively connected with the operating means and with the valve means.

The operator controlled means are operable to first cause movement of the operating means by the power of the operator, and to then move the valve means to the operative position. Since in the operative position of the valve means the variable pressure chambers are connected with the atmosphere, and the low pressure chambers are connected with each other and with the suction generating means, the atmospheric pressure in the variable pressure chambers moves the power piston means into the low pressure chambers whereby the force transmitting means is displaced by the booster force and acts on the operating means, for example on the master piston of the brake system of a motor car to exert a very high braking power. In the preferred embodiment of the invention, the force transmitting means is a force transmitting body located in the axis of the power piston means and power cylinder means and having first duct means connecting the low pressure chambers, second duct means connecting the variable pressure chambers, and third duct means connecting the low pressure chamber, which is not connected with the suction generating means, with the second duct means. The valve means is disposed in the third duct means and connects in the normal position the respective low pressure chamber through the third and second duct means with the variable pressure chambers, and connects in the operative position the second duct means with the atmosphere while closing the third duct means so that atmospheric pressure prevails in the variable pressure chambers.

The ends of the force transmitting body are secured to inner annular portions of the power pistons. The valve means are constituted by a central membrane of one of the power piston means, and by valve seats respectively provided on a part of the operator controlled means, and on the force transmitting body. The force transmitting body directly abuts the master piston of the brake system, and is connected with the operator controlled means by a spring. The operator controlled means are movable in a bore extending in the axis of the force transmitting body.

Consequently, within the force transmitting body, the valve seats, and all ducts required for controlling the operation of the booster servomotor are provided.

In a preferred embodiment of the invention, an insert is secured to the force transmitting body and has an annular valve seat cooperating with the central membrane of one of the power pistons.

It is also advantageous to provide an insert having all necessary ducts in the force transmitting body.

The above-mentioned inserts are preferably made of light metal, an artificial resin, or similar light and wear-resistant material, and all ducts and the valve seat may be formed in one such insert, while the force transmitting body itself is secured to the power pistons and slidably mounted in sealing means carried by at least one of the power cylinders.

In such an arrangement, the ducts are very well protected from outer forces, and can be easily exchanged, together with the valve seat.

The construction of the invention eliminates elastic elements connected with the pneumatic valve system, and permits a smooth operation of the brake pedal by the driver without a noticeable transition at the point where the force of the operator is augmented by the force of the booster.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF THE PREFERRED EMBODIMENT

Figure 1:
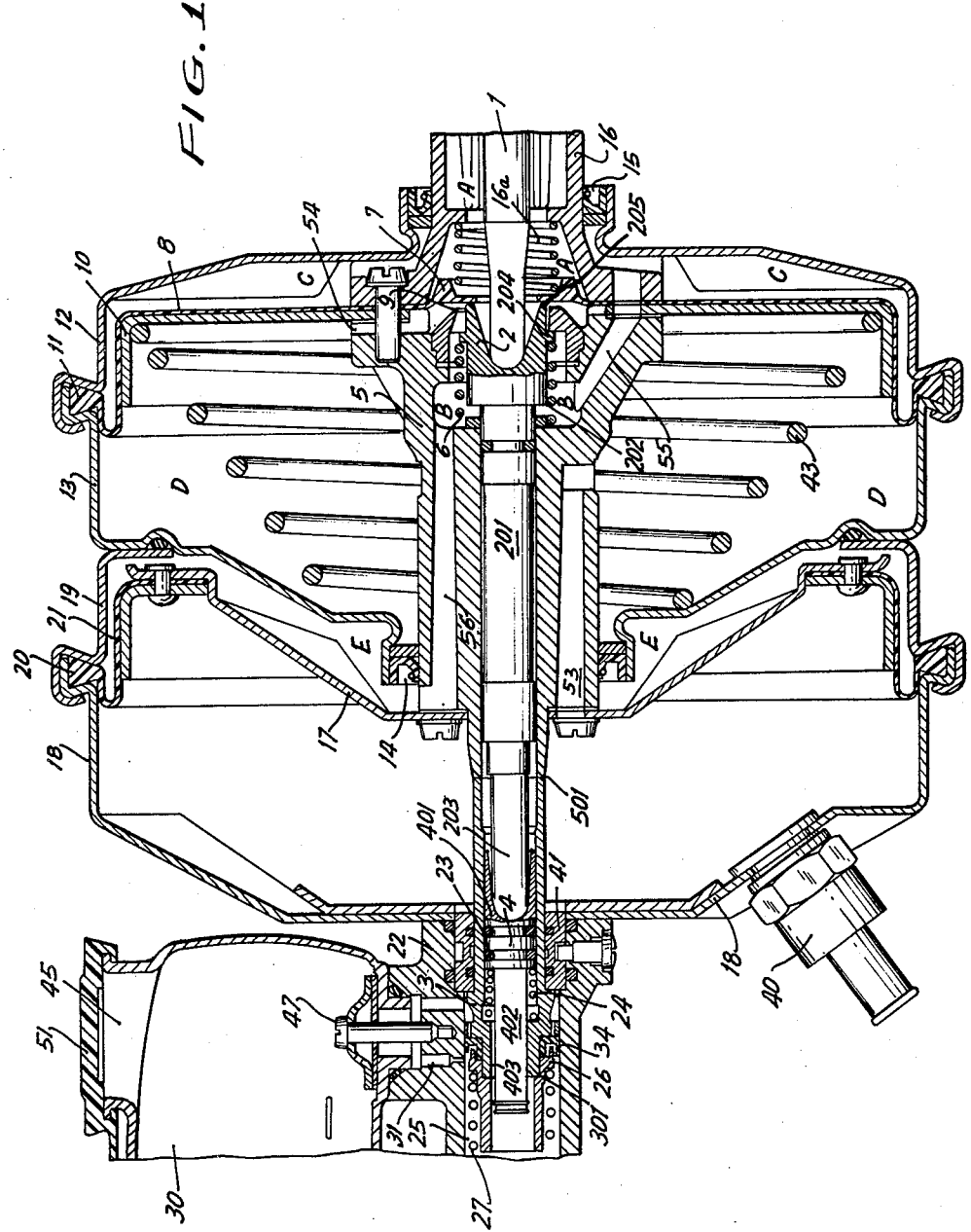
FIG. 1 is an axial sectional view illustrating an embodiment of the invention used with a hydraulic system.

Referring now to the drawings, the force exerted by the driver on the brake pedal, not shown, is transmitted by suitable linkage, not shown, to a push rod 1 whose spherical head is located in a matching recess of an actuating member 2 which has in addition to the head portion 202, two stepped reduced portions 201 and 203. Portion 203 has a spherical end located in a matching recess of the head portion 401 of a sensing piston 4 which is located in the axial bore of a tubular master piston 3. A sealing ring 34 is provided between the master piston and the master cylinder 22 in which master piston 4 is slidable. A spring 27 abuts an annular shoulder 26 of master piston 3 and a shoulder, not shown, of master cylinder 22 to urge master piston 3 to the right as viewed in FIG. 1. Another spring 24 abuts an inner shoulder of master piston 3 and a shoulder of the stepped sensing piston 4 to urge the same against the operator controlled actuating member 2, 201, 203. Sensing piston 4 is located in a space communicating with the bore of master cylinder 22 filled with pressure fluid 25, such as oil. The fluid pressure produced by operation of master piston 3 is transmitted through conduits to the hydraulic brake pistons, not shown, of a motor car. A container 30 contains brake fluid and communicates through a valve 47 with the bore of master cylinder 22. When master piston moves to the right as viewed in FIG. 1, oil is sucked through inlet conduit 31 into the master cylinder. When master piston 3 moves to the left, the sealing means 34 moves beyond conduit 31 and the oil pressure is increased in the conduits of the brake system to operate the associated brake pistons with the force determined by the pressure in the master cylinder. Container 30 has an inlet 44 closed by cover 51.

The actuating member 2, and more particularly its part 201, is mounted for sliding movement in a force transmitting body 5 which has an annular rim abutting a corresponding annular rim 501 of master piston 3. The head portion 202 has an outwardly projecting flange 204 against which the end of a spring 6 abuts, whose other end engages a surface of force transmitting body 5. The head 202 has a circular valve seat 205 cooperating with a flexible membrane 7 which is the central part of a piston membrane 8.

A second valve seat 9 is provided on an insert consisting of light metal or a synthetic plastic material secured to, and forming part of the force transmitting body 5. Valve seat 9 surrounds valve seat 205 and also cooperates with the central membrane 7, but is axially spaced from the same in a normal inoperative position of valve membrane 7 shown in FIG. 1.

The piston membrane 8, of which valve membrane 7 is the central part, has a peripheral bead 11 clamped between crimped annular edge portions of walls 12 and 13 of the first power cylinder. A dished rigid piston part 10 is secured to piston membrane 8 and forms the first power piston with the same. An inner annular portion of the power piston 8, 10 is secured to a flange at the end of force transmitting body 5 by circumferentially spaced screws passing through corresponding holes in the flange of a member 16.

A sealing ring 15 is located between member 16 and an inner flange of wall 12 of the first power cylinder, while a sealing means 14 is located between the force transmitting body 5 and an inner flange of wall 13.

The other power cylinder has a wall 19 secured to wall 13 and a wall 18 secured to an annular part 41 which has sealing rings surrounding power piston 3 and providing a stop limiting axial movement of power piston 3 to the right as viewed in the drawing.

The second power piston 17 of power cylinder 18, 19 has an inner annular rigid portion secured by screws to the left end of the force transmitting body 5. A membrane 21 has a bead 20 secured between crimped portions of walls 18 and 19, and permitting movement of power piston 17 with the force transmitting means 5.

Suction generating means 40 are connected to the low pressure chamber F between power cylinder wall 18 and power piston 17. A hose, not shown, preferably connects member 40 with the intake manifold of a motor driving the motor car on which the apparatus is mounted. A check valve, not shown, is provided in the suction conduit in the usual manner. The annular member 41 and its sealing rings seal the low pressure pneumatic chamber F from the interior of the power cylinder 22. A screw passing through a boss on power cylinder 22 secures annular member 41 against movement in axial direction, so that the same can serve as a stop for power piston 3 which is urged by spring 27 against the left end of annular member 41.

Sensing piston 4 has a reduced portion 402 slidably guided in a corresponding narrower bore of power piston 3 which has axially extending grooves 403 permitting discharge of air bubbles into the bore of the master cylinder 22 during operation of the sensing piston 4.

A strong coil spring 43 abuts an inner portion of cylinder wall 13, and a rigid part 10 of power piston 10, 8, and resists movement of power piston 10, 8 toward the left as viewed in FIG. 1.

Power piston 17, 21 forms in power cylinder 18, 19 the low pressure chamber F, and a variable pressure chamber E which surrounds the force transmitting body 5. Power piston 10, 8 forms in power cylinder 12, 13, a low pressure chamber D, and a variable pressure chamber C surrounding the flange of member 16 which is secured to force transmitting body 5 and to power piston 8, 10. The right end of member 16 is open and forms a space A communicating with the atmosphere. Since push rod 1 passes through a larger opening in a transverse wall of member 16, the atmospheric pressure chamber A extends to the central membrane portion 7, and through a central opening in the same into the recess in the head portion of actuating member 2. A coil spring surrounds push rod 1 and abuts the transverse wall of member 16 and the central membrane 7 so that the same is urged toward the left as viewed in FIG. 1 into abutment with the first valve seat 205 on actuating member 2. However, since valve seat 205 projects beyond valve seat 9, the central membrane portion 7 cannot abut valve seat 9 as long as power piston 10, 8 is in the position illustrated in FIG. 1.

The low pressure chambers F and D are connected with each other by a first duct means 53 in the force transmitting body 5. An inner chamber B of force transmitting body 5 communicates with the annular opening between valve seat 205 and 9. Second duct means include chamber B, a duct 56 connecting chamber B with the variable pressure chamber E, and another duct 55 connecting chamber B through an opening in power piston 8, 10 and the registering opening in the flange of member 16, with the variable pressure chamber C. Due to the fact that the second duct means 55, B, 56 always connect the variable pressure chambers E and C, the same pressure must prevail in the same at all times. The duct 53 assures that the same low pressure always prevails in both low pressure chambers F and D, chamber F being connected with the suction generating means 40.

A third duct means in force transmitting body 5 includes a duct 54 which opens adjacent power piston 8, 10 into the low pressure chamber D, and a duct portion formed between the valve seats 9 and 205 and communicating with chamber B which, as explained above, communicates with both variable pressure chambers E and C.

In the inoperative position of the apparatus shown in FIG. 1 in which valve membrane 7 abuts valve seat 205, the third duct means 54 is connected through the gap between valve seats 9 and 205 with chamber B of the second duct means 56, 55 and the low pressure chamber D is connected with both variable pressure chambers E and C so that the same low pressure prevails in the same as in the low pressure chambers F and D. Atmospheric pressure from chamber A cannot enter the ducts or pressure chambers, since the valve seat 205 is engaged by the spring loaded central valve membrane 7. The force transmitting body 5 is held by spring 43 in the illustrated position so that both power pistons 17, 21 and 8, 9 are in their terminal positions in which the flange of member 16 abuts cylinder wall 12. Spring 24 in the power piston 3, and the pressure in the interior of power cylinder 22 acting on feeler piston 4, urge actuating member 2 into engagement with the head of push rod 1 whose movement to the right with the brake pedal, not shown, is limited by stop, not shown.

When the driver steps on the brake pedal the operator controlled means 1, 2 move to the left as viewed in FIG. 1 so that feeler piston 4 is displaced. As long as the resilient force of spring 6 is not overcome, the force exerted by the driver on the operator controlled means 1, 2 is transmitted to the force transmitting means, 5, 16 so that the same moves to the left as viewed in the drawing and displaces master piston 3 which increases the pressure in the hydraulic brake system and exerts a brake action under the control of the muscular force of the operator. When the hydraulic force opposing the movement of master piston 3 is sufficiently great, the muscular force of the operator is sufficient to slightly compress spring 6 so that actuating member 2 moves relative to force transmitting body 5 and to valve seat 9 to the position shown in FIG. 2. Due to the action of the spring biasing the flexible valve membrane 7, the valve membrane resiliently engages both valve seats 9 and 205 in the position of FIG. 2.

The valve means constituted by valve membrane 7 and valve seats 9 and 205, is now in a position in which the third duct means 54 is closed and separated from the second duct means 55, 56. Consequently, the low pressure chambers F and D are separated from the variable pressure chambers E and C in which, however, still low pressure prevails.

Figure 3:
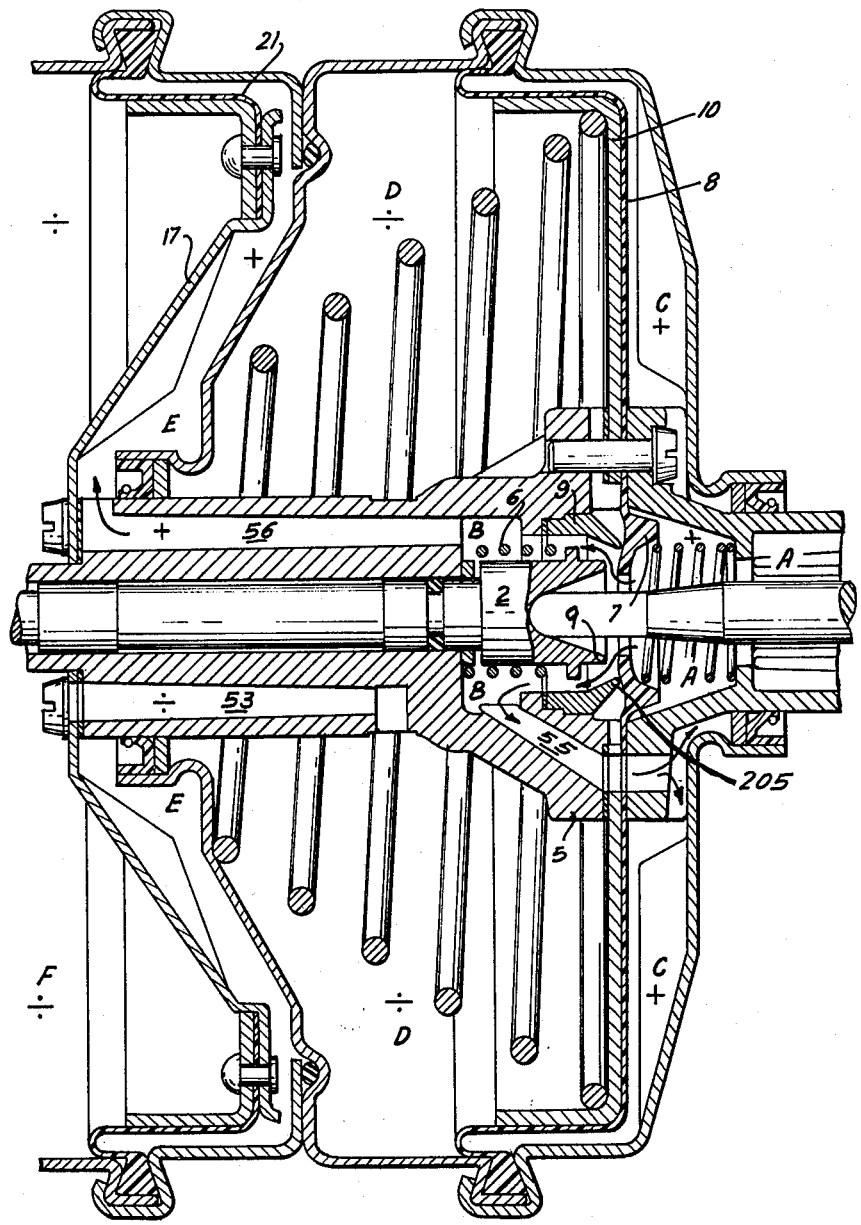
FIG. 3 is a fragmentary axial sectional view illustrating the embodiment of FIG. 1 in an operational position in which the pneumatic booster motor is effective.

When the driver continues pressure on the operator controlled means 1, 2, spring 6 is further compressed and actuating member 2 with valve seat 205 moves away from valve membrane 7 which cannot resiliently follow since it is stopped by valve seat 9 in the position of FIG. 3.

Air under atmospheric pressure flows now from space A through the central opening in valve membrane 7 in the direction of the arrow in FIG. 3 into chamber B, and from there through the second ducts 55 and 56 into the variable pressure chambers C and E.

Figure 2:
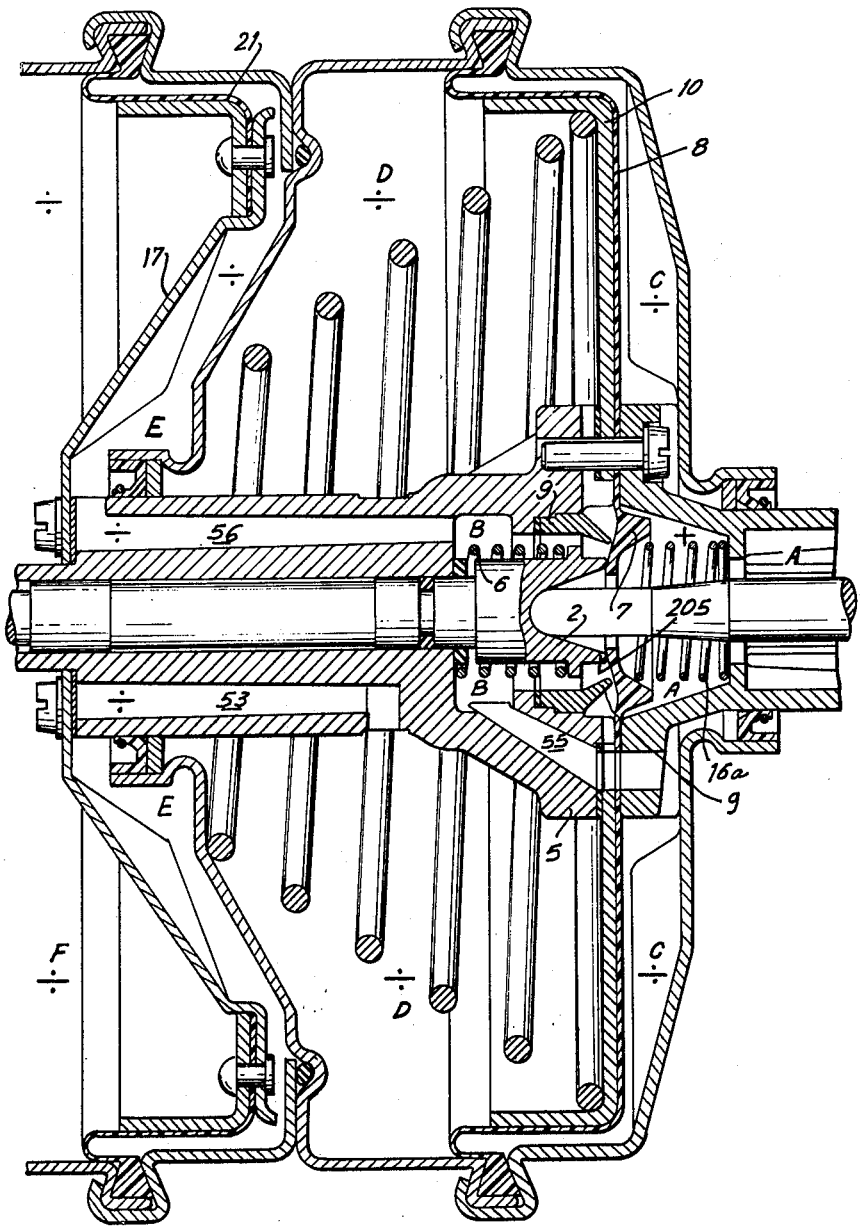
FIG. 2 is a fragmentary axial sectional view illustrating the embodiment of FIG. 1 in a position controlled by the force of the operator.

While in the position of FIG. 2, all pressure chambers were connected to the suction generating means 40, as indicated by minus signs, atmospheric pressure prevails in the position of FIG. 3 in the variable pressure chambers C and E as indicated by plus signs.

Since the pressure on the right of pistons 17, 21 and 8, 10 is greater than the pressure on the left thereof, the power pistons 17, 19 and 8, 10 move to the left as viewed in the drawing together with the force transmitting means 5, 16 to which they are secured. Power piston 8, 10 overcomes the resistance of spring 43 during such movement.

Any time the driver discontinues its pressure on the brake pedal and on the operator controlled means 1, 2, spring 6 restores actuating member 2 and valve seat 205 to the position illustrated in FIG. 1, and the spring 43 restores power piston 8, 10 toward its initial position on the right as shown in FIG. 1, and since force transmitting means 5, 16 are secured to power piston 8, 10 and to power piston 7, 21, force transmitting body 5 with valve seat 9 is restored to the position of FIG. 1 and power piston 17, 21 assumes its initial position shown in FIG. 1.

The oil pressure prevailing in the master cylinder 22 acts during any phase of the operation on sensing piston 4 which transmits an axial force to the operator controlled means 1, 2, and also to the brake pedal, not shown. Consequently, the driver feels at all times a counter pressure on the brake pedal corresponding to the pressure prevailing in the master cylinder 22 and in the brake system, and thus representing the brake force applied to the wheels of the car. The counter pressure also represents the booster force produced by the power pistons as well as the initial muscular force applied by the driver. The ratio between the pressure surface of the sensing piston 4 and the pressure surface of the master piston 3 is equal to the ratio between the force produced by the power pistons, and the counter pressure on the brake pedal felt by the driver. This ratio is linear so that the driver feels in any brake situation a counter force indicating the actually applied brake power and being always in the same ratio to the brake effect. Due to this fact, very great booster power can be used without the danger that the driver does not realize the very great brake force which is applied by the booster due to a light pressure on the brake pedal. The result is a smooth and effective braking under full control of the driver.

Figure 4:
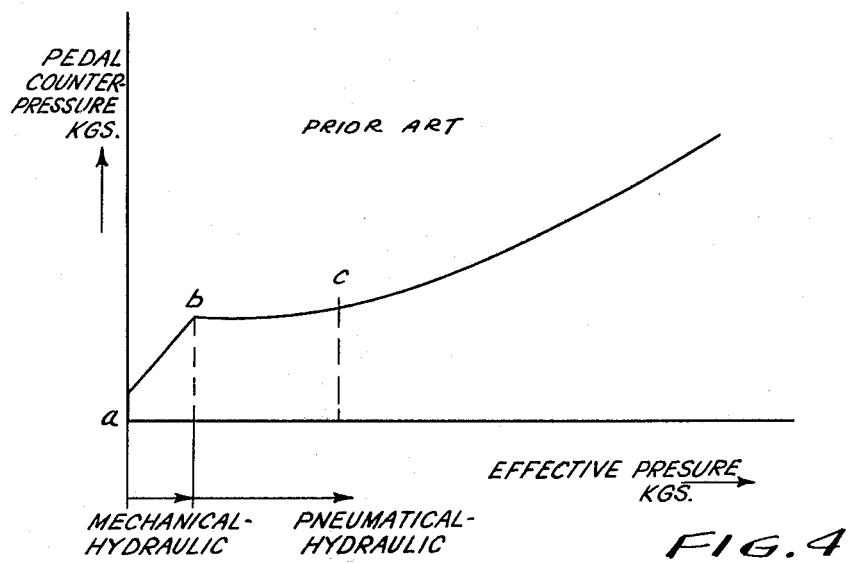
FIG. 4 is a diagram showing the relationship between the pedal counterpressure and the effective braking pressure in a conventional power brake system.
Figure 5:
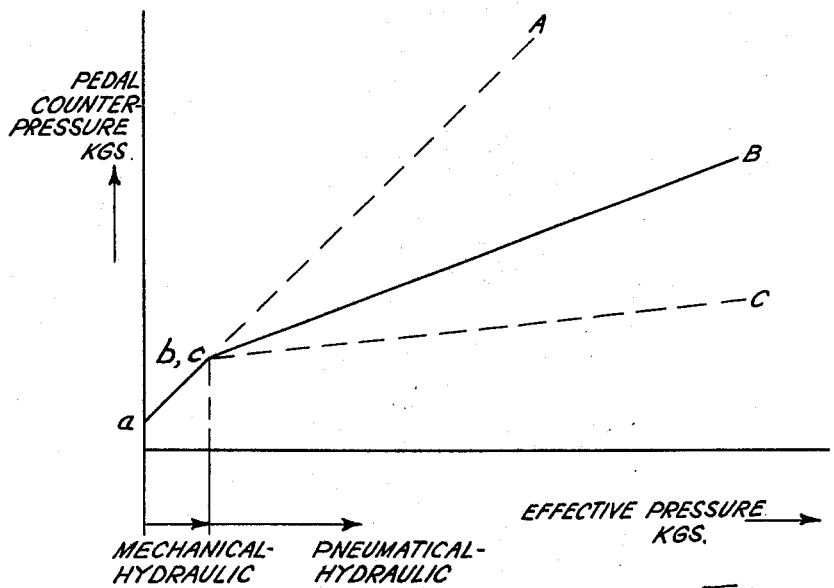
FIG. 5 is a diagram showing the relationship between the pedal counterpressure and the effective braking pressure in the embodiment of FIG. 1.
Figure 6:
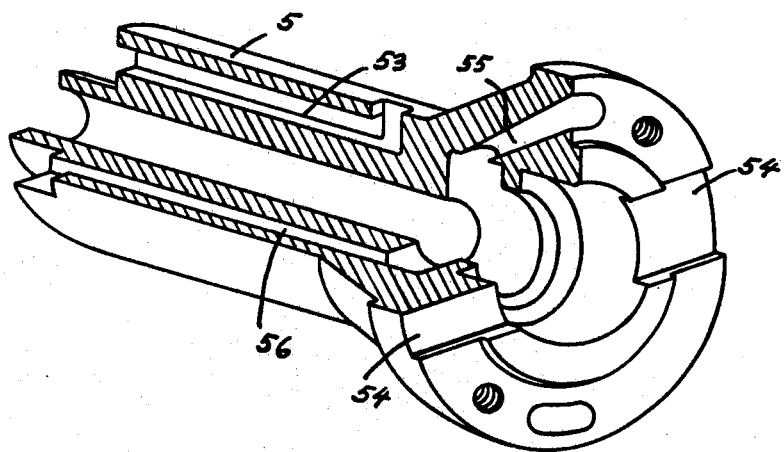
FIG. 6 is a perspective view of a force transmitting body.

This advantage of the apparatus of the invention will be best understood with reference to FIGS. 4 and 5, of which FIG. 4 illustrates the condition prevailing in prior art constructions.

The diagrams of FIGS. 4 and 5 illustrate the rise in pedal counter pressure as a function of the effective brake pressure, measured in kilograms. In the prior art arrangement shown in a diagram of FIG. 4, the driver first overcomes the pedal counter pressure at $a$ which depends on the spring acting on the brake pedal. The braking action begins at $a$ and rises linearly to the point $b$ solely in response to the mechanical and hydraulic pressure produced by the muscular force of the operator. In the stage between the point $a$ and $b$, the booster motor is not yet effective, and its action begins at $b$. Between the points $b$ and $c$ in FIG. 4, the pneumatic and hydraulic pressure produced by the booster motor is rapidly increased in the region between b and c, while the counter pressure on the brake pedal remains the same so that the driver has no sensation that the brake pressure has been increased. Consequently, the operator of the vehicle is not aware of the greatly increased brake force produced by the booster motor, because his foot does not meet any great resistance of the brake pedal. The effective pressure at c corresponds to a hydraulic pressure of 20 to 25 atmospheres. From then on, the curve indicating the relationship between the pedal counter pressure and the effective pressure resembles a parabola and the driver has some indication of the actually applied brake force, and can control the braking action accordingly.

Referring now to FIG. 5 which illustrates the relationship between pedal counter pressure and effective brake pressure in the apparatus of the invention, at the start of the braking operation, the hydraulic brake system is controlled by the muscular force of the driver between the points a and b, and the counter pressure represents the actually applied brake force. In the apparatus of the invention, the point b coincides with the point c, because the driver senses an increased counter pressure force produced by the sensing piston 4 as soon as the pressure rises in master cylinder 22 due to the action of the power booster starting its operation in the position of the apparatus illustrated in FIG. 3. The pedal counter pressure rises linearly as indicated by lines A, B and C until the braking pressure produced by the booster attains a maximum value and the power pistons have arrived in the left end position so that master piston 3 cannot be further displaced. The inclination of the line indicating the ratio of counter pressure to effective brake pressure depends on the ratio between the area of the pressure faces of the sensing piston 4 and the master piston 3, which are selected by the designer in accordance with the desired type of brake action. The line A in FIG. 5 indicates a sharp braking action preferred for sports cars which can be brought about by increasing the pressure surface area of sensing piston 4 so that it is substantially equal with the pressure surface area of the master piston 3. A less rapid braking action is obtained when the ratio of the pressure surfaces is differently selected, and the effective pressure surface of the sensing piston 4 is reduced. In such an arrangement, the counter pressure produced on the brake pedal rises less rapidly than the effective brake pressure, as indicated by line B. If the pressure surface of sensing piston 4 is further reduced, the braking action will be represented by the line C. In all arrangements shown in the diagram of FIG. 5, the counter pressure force will rise in dependence on an increase of the brake pressure force, contrary to the prior art arrangement shown in FIG. 4 in which the driver feels no increased resistance at the brake pedal while the booster motor takes over and applies a rapidly increased brake pressure in the area between the points b and c. The greatest brake force will be produced by the booster motor when the driver correspondingly increases the pressure he exerts on the brake pedal to overcome the counter pressure rising in a predetermined ratio with the actually applied brake force.

It will be understood that each of the elements described above, or two or more together, may also find a useful application in other types of power booster arrangements differing from the types described above.

While the invention has been illustrated and described as embodied in a multiple power booster arrangement for the hydraulic brake system of a motor car and including at least two power pistons connected through force transmitting means with the master piston of a brake system, it is not intended to be limited to the details shown, since various modifications and structural changes may be made without departing in any way from the spirit of the present invention.

What is claimed as new and desired to be protected by Letters Patent is set forth in the appended claims.

I claim:
1. A power booster arrangement comprising, in combination, at least first and second power cylinder means; first and second power piston means respectively movable in said first and second power cylinder means and forming, respectively, first and second low pressure chambers and first and second variable pressure chambers in said first and second power cylinder means; suction generating means connected with at least one of said low pressure chambers; force transmitting means disposed in said first and second power cylinder means and being secured in said first and second power piston means to connect the same for movement together, and having duct means for connecting said pressure chambers, and a first valve seat; valve means in said duct means having a normal inoperative position connecting all said pressure chambers through said duct means with each other, and an operative position connecting said variable pressure chambers with the atmosphere, and said low pressure chambers with each other so that atmospheric pressure in said variable pressure chambers moves said first and second power piston means into said low pressure chambers whereby said force transmitting means is displaced, said valve means including a flexible membrane secured to said first power piston means and having an opening communicating with the atmosphere; operating means operatively connected with force transmitting means and including a second valve seat, said flexible membrane engaging only said second valve seat in said inoperative position of said valve means for closing said opening therein, said membrane engaging only said first valve seat in said operative position of said valve means; and operator controlled means operatively connected with said operating means and with said membrane of said valve means and being operable to first cause movement of said operating means, and to then move said membrane of said valve means to said operative position so that said first and second power piston means move said force transmitting means and thereby said operating means.

2. An arrangement as claimed in claim 1 wherein said first valve seat includes a ring-shaped insert, and wherein said force transmitting means has an annular recess for holding said insert.

3. An arrangement as claimed in claim 1 wherein said duct means include hollow inserts, and wherein said force transmitting means has recesses for receiving said inserts.

4. Power booster arrangement as defined in claim 1 wherein said duct means has a duct portion located between said first and second valve seats; wherein said flexable membrane is resiliently deformed by said second valve seat in said normal inoperative position to follow said second valve seat while the same moves with said operator controlled means, until said flexible membrane abuts said first valve seat and closes said portion of said duct means in said operative position.

5. Power booster arrangement as defined in claim 4, wherein said force transmitting means has first duct means connecting said first and second low pressure chambers, second duct means connecting said first and second variable pressure chambers, and third duct means connecting the other low pressure chamber with said second duct means; and wherein said valve means is disposed in said third duct means and connects in said normal inoperative position said other low pressure chamber through said third and second duct means with said variable pressure chambers, and connects in said operative position said second duct means with the atmosphere while closing said third duct means by said membrane so that atmospheric pressure prevails in said first and second variable pressure chambers.

6. Power booster arrangement as defined in claim 1 for use with a hydraulic brake arrangement for a motor car wherein said operating means includes a master piston abutting said force transmitting means and being operated by the same to actuate the hydraulic brake arrangement.

7. Power booster arrangement as defined in claim 1 wherein said force transmitting means is a force transmitting body centrally located in said power cylinder means; and wherein said first and second power piston means each includes an inner annular portion secured to the axial ends of said force transmitting body, and an outer annular portion consisting of a flexible material.

8. Power booster arrangement as defined in claim 7, wherein said flexible membrane is secured to said inner annular portion of said first power piston means.

9. Power booster arrangement as defined in claim 8 wherein said operator controlled means includes a first actuating part having said second valve seat and extending through said force transmitting means, a spring between said actuating part and said force transmitting body, and a second operator controlled part abutting said first part so that upon actuation of said second operator controlled part said first actuating part is displaced with said force transmitting body and said valve seat so that the same move away from said membrane which follows resiliently until also engaging said first valve seat upon compression of said spring whereupon said actuating part moves further with said second valve seat away from said membrane which rests on said first valve seat.

10. Power booster arrangement as defined in claim 1, wherein said force transmitting means includes a force transmitting body centrally located in said power cylinder means and being secured to said first and second power piston means, and an annular insert in said body consisting of a wear resistant material and forming said second valve seat.

11. Power booster arrangement as defined in claim 1, wherein said force transmitting means has first duct means connecting said first and second low pressure chambers, second duct means connecting said first and second variable pressure chambers, and third duct means connecting the other low pressure chamber with said second duct means; wherein said force transmitting means includes a body and an insert in said body formed with said duct means; wherein said valve means is disposed in said third duct means and connects in said normal inoperative position said other low pressure chamber through said third and second duct means with said variable pressure chambers, and connects in said operative position said second duct means with the atmosphere while closing said third duct means so that atmospheric pressure prevails in said first and second variable pressure chambers.

References Cited
UNITED STATES PATENTS

| | | | |
|---|---|---|---|
| 2,873,724 | 2/1959 | Olnhausen | 91—391 |
| 2,974,494 | 3/1961 | Rike. | |
| 3,096,689 | 7/1963 | Kytta | 91—376 |
| 3,143,927 | 8/1964 | French et al. | |
| 3,292,502 | 12/1966 | Myers et al. | 91—376 |

PAUL E. MASLOUSKY, Primary Examiner

U.S. Cl. X.R.

91—376, 391, 411; 92—48